(12) United States Patent
Ko

(10) Patent No.: US 11,850,545 B2
(45) Date of Patent: Dec. 26, 2023

(54) SYSTEM AND METHOD FOR PRESSURE SWING ADSORPTION

(71) Applicants: HYUNDAI MOTOR COMPANY, Seoul (KR); KIA MOTORS CORPORATION, Seoul (KR)

(72) Inventor: Dong Seok Ko, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 183 days.

(21) Appl. No.: 17/188,104

(22) Filed: Mar. 1, 2021

(65) Prior Publication Data

US 2022/0096994 A1   Mar. 31, 2022

(30) Foreign Application Priority Data

Sep. 29, 2020   (KR) .................. 10-2020-0126891

(51) Int. Cl.
  *B01D 53/047* (2006.01)
  *C01B 3/56* (2006.01)
  *B01D 53/04* (2006.01)

(52) U.S. Cl.
  CPC ....... *B01D 53/0476* (2013.01); *B01D 53/047* (2013.01); *B01D 53/0423* (2013.01);
  (Continued)

(58) Field of Classification Search
  CPC .. B01D 53/04; B01D 53/047; B01D 53/0423; B01D 53/0446; B01D 53/0476;
  (Continued)

(56) References Cited

U.S. PATENT DOCUMENTS 4,077,779 A * 3/1978 Sircar ...................... C01B 3/56
  95/143
4,705,541 A * 11/1987 Sircar .................. B01D 53/047
  95/98

(Continued)

FOREIGN PATENT DOCUMENTS

JP    2017-148715 A    8/2017
KR   10-2001-0060242 A    7/2001
  (Continued)

OTHER PUBLICATIONS

Machine-generated English translation of WO 2018168985 A1, published Sep. 2018.*

*Primary Examiner* — Frank M Lawrence, Jr.
(74) *Attorney, Agent, or Firm* — LEMPIA SUMMERFIELD KATZ LLC

(57) ABSTRACT

A system for pressure swing adsorption including: a plurality of beds each performing at least one of an adsorbing process, a pressure equalizing process, a vacuum process, or a pressurizing process; a supply valve provided in each of the beds and connected to a mixed gas supply unit to supply a mixed gas to the bed; a discharge valve provided in each of the beds and connected to a hydrogen gas discharge unit to discharge hydrogen generated in the bed; a vacuum valve provided in each of the beds and connected to a vacuum pump so as to be open to the vacuum pump during the vacuum process of the bed; and a control unit that controls the supply valve, the discharge valve, and the vacuum valve to allow each of the beds to perform the adsorbing process, the pressure equalizing process, the vacuum process, or the pressurizing process.

13 Claims, 5 Drawing Sheets

(52) U.S. Cl.
CPC ............ B01D 53/0446 (2013.01); C01B 3/56 (2013.01); *B01D 2256/16* (2013.01); *B01D 2259/40003* (2013.01); *B01D 2259/40007* (2013.01); *B01D 2259/40016* (2013.01); *B01D 2259/40022* (2013.01); *B01D 2259/40028* (2013.01); *B01D 2259/40039* (2013.01); *B01D 2259/40052* (2013.01); *B01D 2259/4062* (2013.01); *B01D 2259/40075* (2013.01)

(58) Field of Classification Search
CPC ...... B01D 2256/16; B01D 2259/40003; B01D 2259/40007; B01D 2259/40016; B01D 2259/40022; B01D 2259/40028; B01D 2259/40039; B01D 2259/40052; B01D 2259/40075; B01D 2259/4062; C01B 3/508; C01B 3/56
USPC ................................................ 95/96; 96/121
See application file for complete search history.

(56) References Cited

U.S. PATENT DOCUMENTS

| | | | | |
|---|---|---|---|---|
| 5,096,470 | A * | 3/1992 | Krishnamurthy | B01D 53/047 95/143 |
| 5,133,785 | A * | 7/1992 | Kumar | B01D 53/0476 95/143 |
| 5,518,526 | A * | 5/1996 | Baksh | B01D 53/0476 95/122 |
| 6,007,606 | A * | 12/1999 | Baksh | B01D 53/053 95/98 |
| 6,699,307 | B1 * | 3/2004 | Lomax, Jr. | B01D 53/053 96/144 |
| 8,551,217 | B2 * | 10/2013 | Baksh | B01D 53/047 95/96 |
| 2005/0098034 | A1 * | 5/2005 | Gittleman | C01B 3/56 96/121 |
| 2007/0232706 | A1 * | 10/2007 | Shah | C01B 3/384 518/703 |
| 2008/0072752 | A1 * | 3/2008 | Kumar | B01D 53/0476 95/103 |
| 2010/0129284 | A1 * | 5/2010 | Niitsuma | C01B 3/382 423/437.1 |
| 2011/0005391 | A1 * | 1/2011 | Cho | B01D 53/047 95/96 |
| 2013/0255492 | A1 * | 10/2013 | Hsu | C01B 3/56 95/100 |
| 2014/0373713 | A1 * | 12/2014 | Weist, Jr. | B01D 53/047 95/100 |
| 2020/0122080 | A1 * | 4/2020 | Asonuma | C01B 3/56 |

FOREIGN PATENT DOCUMENTS

| | | |
|---|---|---|
| KR | 10-1961233 B1 | 3/2019 |
| KR | 10-2033456 B1 | 11/2019 |
| WO | WO-2018168985 A1 * | 9/2018 ........... B01D 53/047 |

* cited by examiner

FIG. 3

| BED | Step 1 | Step 2 | Step 3 | Step 4 | Step 5 | Step 6 | Step 7 | Step 8 | Step 9 | Step 10 | Step 11 | Step 12 |
|---|---|---|---|---|---|---|---|---|---|---|---|---|
| 1 | ADSORPTION | ADSORPTION | PRESSURE EQUALIZATION1 | PRESSURE EQUALIZATION2 | PRESSURE EQUALIZATION3 | DEPRESSURIZATION | VACUUM | VACUUM | PRESSURIZATION1 | PRESSURIZATION2 | PRESSURIZATION3 | PRESSURE RAISING |
| 2 | PRESSURE EQUALIZATION1 | PRESSURE EQUALIZATION2 | PRESSURE EQUALIZATION3 | DEPRESSURIZATION | VACUUM | VACUUM | PRESSURIZATION1 | PRESSURIZATION2 | PRESSURIZATION3 | PRESSURE RAISING | ADSORPTION | ADSORPTION |
| 3 | PRESSURE EQUALIZATION3 | DEPRESSURIZATION | VACUUM | VACUUM | PRESSURIZATION1 | PRESSURIZATION2 | PRESSURIZATION3 | PRESSURE RAISING | ADSORPTION | ADSORPTION | PRESSURE EQUALIZATION1 | PRESSURE EQUALIZATION2 |
| 4 | VACUUM | VACUUM | PRESSURIZATION1 | PRESSURIZATION2 | PRESSURIZATION3 | PRESSURE RAISING | ADSORPTION | ADSORPTION | PRESSURE EQUALIZATION1 | PRESSURE EQUALIZATION2 | PRESSURE EQUALIZATION3 | DEPRESSURIZATION |
| 5 | PRESSURIZATION1 | PRESSURIZATION2 | PRESSURIZATION3 | PRESSURE RAISING | ADSORPTION | ADSORPTION | PRESSURE EQUALIZATION1 | PRESSURE EQUALIZATION2 | PRESSURE EQUALIZATION3 | DEPRESSURIZATION | VACUUM | VACUUM |
| 6 | PRESSURIZATION3 | PRESSURE RAISING | ADSORPTION | ADSORPTION | PRESSURE EQUALIZATION1 | PRESSURE EQUALIZATION2 | PRESSURE EQUALIZATION3 | DEPRESSURIZATION | VACUUM | VACUUM | PRESSURIZATION1 | PRESSURIZATION2 |

SYSTEM AND METHOD FOR PRESSURE SWING ADSORPTION

CROSS REFERENCE TO RELATED APPLICATION

This application claims priority to and the benefit of Korean Patent Application No. 10-2020-0126891, filed on Sep. 29, 2020, the entire contents of which are incorporated herein by reference.

FIELD

The present disclosure relates to a system and a method for pressure swing adsorption capable of extracting hydrogen by supplying a mixed gas to a plurality of beds and repeatedly performing an adsorbing process, a pressure equalizing process, a vacuum process, and a pressurizing process in the plurality of beds.

BACKGROUND

The statements in this section merely provide background information related to the present disclosure and may not constitute prior art.

A system for pressure swing adsorption refers to a hydrogen reforming system that extracts hydrogen, in which only hydrogen is separated and purified from a mixed gas produced in a reformer and a transformer. In general, an adsorption bed is filled with an adsorption material for adsorbing gas contained in the mixed gas except hydrogen, and the mixed gas is injected into the adsorption bed to extract hydrogen. In the adsorption bed, the following processes are performed: an adsorbing process for separating hydrogen from the mixed gas to discharge the hydrogen; a pressure equalizing process for equalizing a pressure in the adsorption bed by connecting the bed in which the adsorption has been finished to another adsorption bed that is on standby; a depressurizing process for removing the mixed gas existing in the adsorption bed after the pressure equalization; a cleaning process for cleaning the mixed gas existing in the adsorption bed using hydrogen gas after the depressurization; a pressurizing process for raising the pressure in the adsorption bed by connecting the adsorption bed in which the cleaning has been finished to another adsorption bed in which adsorption has been finished; and a pressure raising process for raising the pressure in the adsorption bed using hydrogen gas after the pressurization to be the same as that in the adsorbing process to prepare adsorption.

However, we have discovered that the cleaning process is performed using the hydrogen extracted through the system for pressure swing adsorption, resulting in a problem that hydrogen extracting efficiency is inferior.

The contents described as the related art have been provided only to assist in understanding the background of the present disclosure and should not be considered as corresponding to the related art known to those having ordinary skill in the art.

SUMMARY

The present disclosure provides a system and a method for pressure swing adsorption capable of extracting hydrogen with high efficiency by supplying a mixed gas to a plurality of beds and repeatedly performing: an adsorbing process, a pressure equalizing process, a vacuum process, and a pressurizing process in the plurality of beds. In particular, the vacuum process is performed using a vacuum pump instead of a conventional cleaning process.

According to one form of the present disclosure, a system for pressure swing adsorption includes: a plurality of beds each performing at least one of an adsorbing process, a pressure equalizing process, a vacuum process, or a pressurizing process; a supply valve provided in each of the beds and connected to a mixed gas supply unit to supply a mixed gas to the bed; a discharge valve provided in each of the beds and connected to a hydrogen gas discharge unit to discharge hydrogen generated in the bed; a vacuum valve provided in each of the beds and connected to a vacuum pump to open the vacuum pump during the vacuum process of the bed; and a control unit controlling the supply valve, the discharge valve, and the vacuum valve provided in each of the beds to allow each of the beds to perform the adsorbing process, the pressure equalizing process, the vacuum process, or the pressurizing process.

In one form, the plurality of beds includes an adsorption bed performing the adsorbing process, the control unit may open the supply valve and the discharge valve of the adsorption bed to supply the mixed gas to the adsorption bed through the supply valve and discharge the generated hydrogen through the discharge valve.

In another form, the plurality of beds includes a vacuum bed performing the vacuum process, the control unit may open the vacuum valve of the vacuum bed to remove the mixed gas in the vacuum bed through the vacuum pump.

One or more pressure equalization valves may be provided in each of the beds, and the respective beds may be connected to each other through the pressure equalization valves.

In other form, the plurality of beds includes a pressure equalization bed performing the pressure equalizing process and a pressurization bed performing the pressurizing process, the control unit may open the pressure equalization valves of the pressure equalization bed and the pressurization bed to equalize a pressure between the pressure equalization bed and the pressurization bed through the pressure equalization valves.

The control unit may control the supply valve, the discharge valve, the vacuum valve, or the pressure equalization valves provided in each of the beds to allow each of the beds to sequentially perform the adsorbing process, the pressure equalizing process, the vacuum process, and the pressurizing process.

A depressurization valve may be provided in each of the beds, the depressurization valve may be connected to an off-gas tank, and the plurality of beds includes a pressure equalization bed that has performed the pressure equalizing process, the control unit may open the depressurization valve of the pressure equalization bed to discharge the mixed gas to the off-gas tank.

A recovery valve may be provided in each of the beds, the recovery valve may be connected to the hydrogen gas discharge unit, and for a pressurization bed that has performed the pressurizing process, the control unit may open the recovery valve of the pressurization bed to supply the hydrogen from the hydrogen gas discharge unit to the pressurization bed.

The control unit may generate a process sequence such that processes performed by the respective beds do not overlap, and each of the beds may repeatedly perform the adsorbing process, the pressure equalizing process, the vacuum process, or the pressurizing process according to the process sequence.

The control unit may generate a process sequence such that one or more of the plurality of beds perform the vacuum process, and one or more of the vacuum valves may be opened according to the process sequence.

The number of beds may be six (a first bed, a second bed, a third bed, a fourth bed, a fifth bed and a sixth bed), and the control unit may generate a process sequence such that the first bed performs the adsorbing process, the second bed and the third bed perform a process including the pressure equalizing process, the fourth bed performs the vacuum process, and the fifth bed and the sixth bed perform a process including the pressurizing process.

The control unit may control the six beds to perform respective processes that are not identical to each other in every cycle.

Each of the beds may perform a plurality of processes, and the control unit may generate a process sequence such that each of the beds sequentially performs the adsorbing process, a first pressure equalizing process, a second pressure equalizing process, a third pressure equalizing process, the vacuum process, a first pressurizing process, a second pressurizing process, and a third pressurizing process.

The control unit may control each of the beds to perform a depressurizing process when the third pressure equalizing process is finished and perform a pressure raising process when the third pressurizing process is finished.

According to another form of the present disclosure, a method for pressure swing adsorption includes: a supply step of supplying a mixed gas to each of a plurality of beds from a mixed gas supply unit; a process step of performing an adsorbing process, a pressure equalizing process, a vacuum process, or a pressurizing process in each of the plurality of beds; and a discharge step of discharging hydrogen generated in each of the plurality of beds to a hydrogen gas discharge unit.

In the performing of the process, when the vacuum process is performed in the bed, the bed may be connected to a vacuum pump to remove the mixed gas from the bed.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3 is a view illustrating processes performed by each bed in the system for pressure swing adsorption according to one form of the present disclosure;

Figure 4:
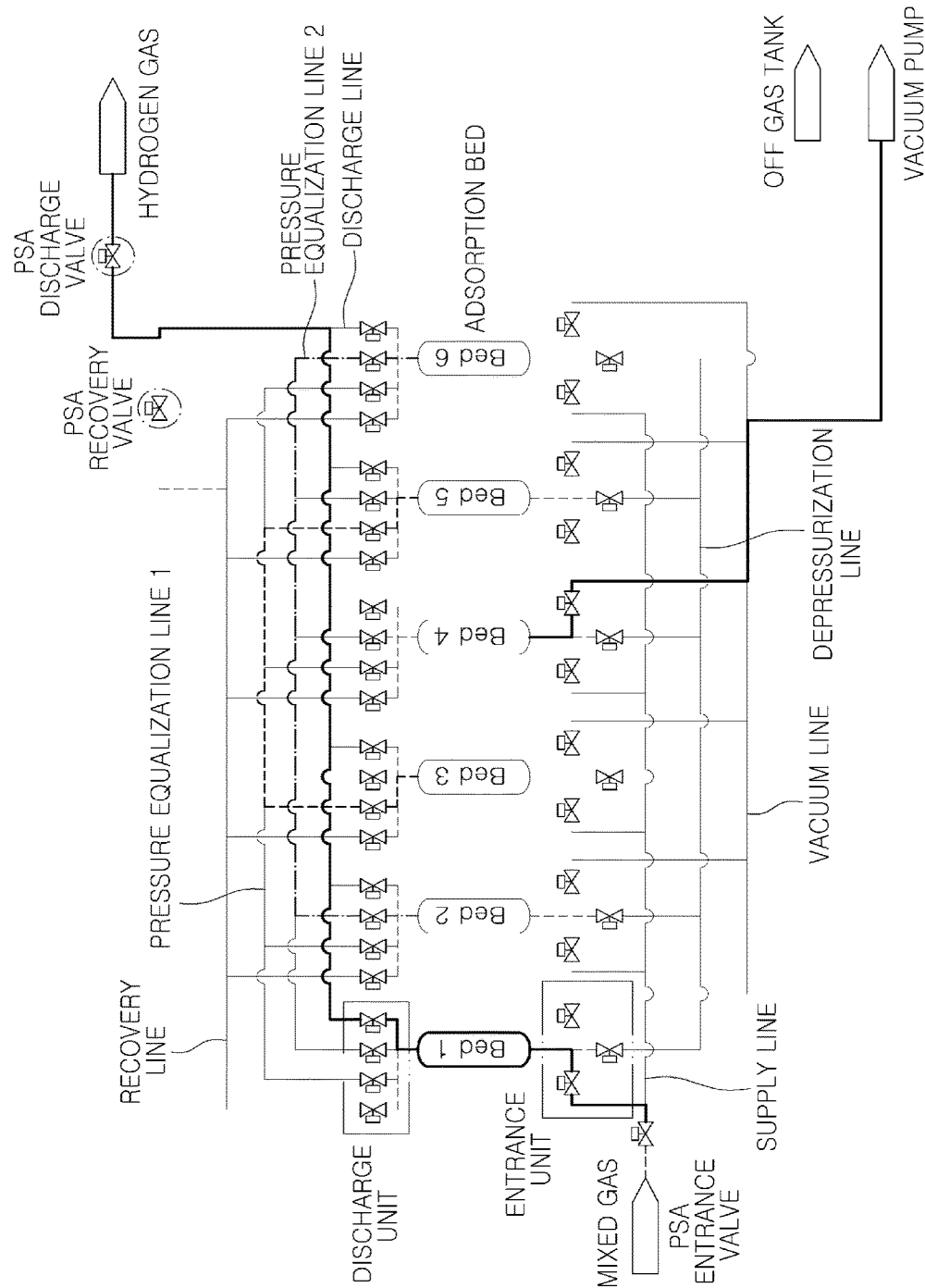
Figure 5:
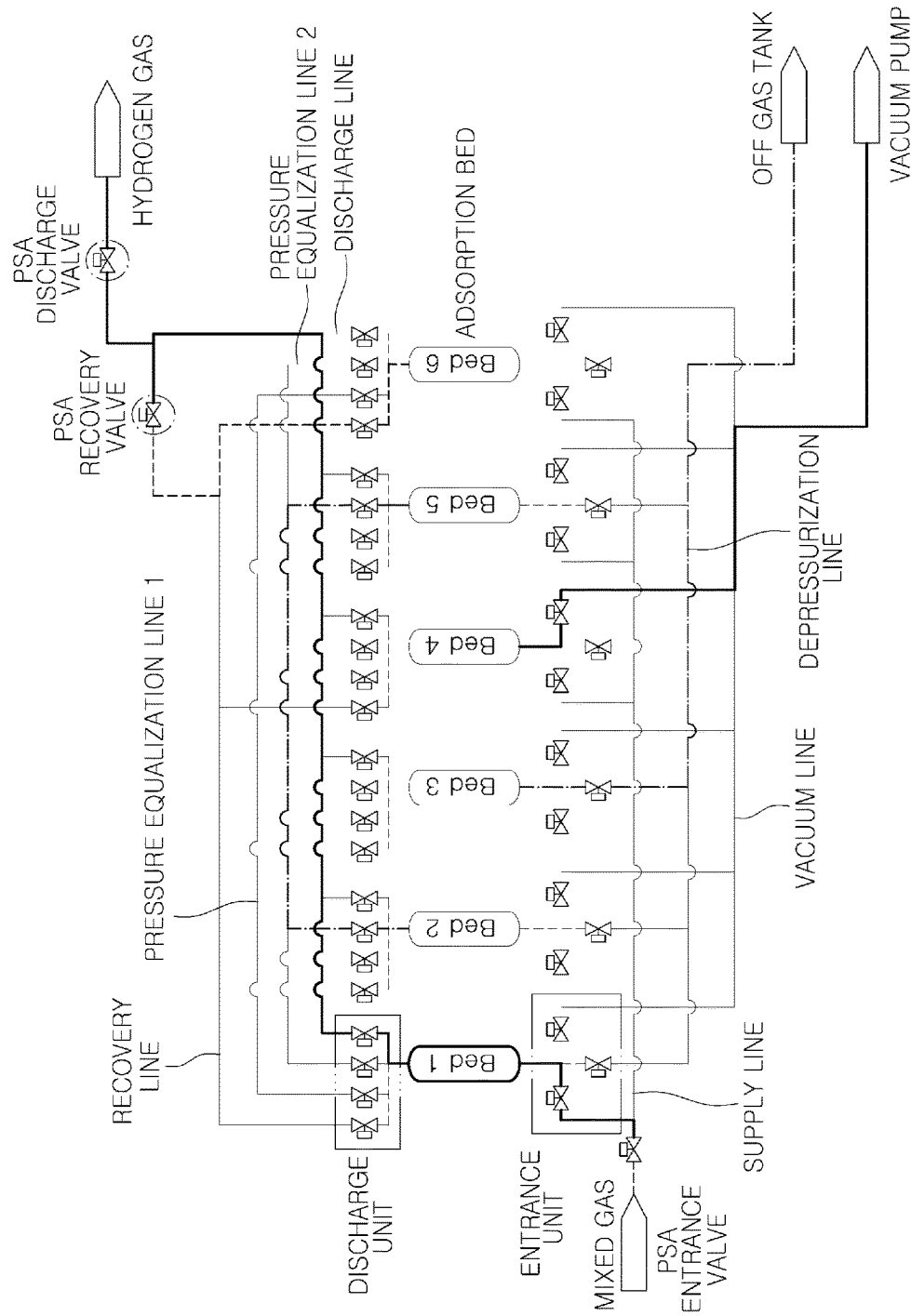

FIG. 4 is a view illustrating that a first bed performs an adsorbing process and a second bed performs a first pressure equalizing process in the system for pressure swing adsorption according to one form of the present disclosure; and FIG. 5 is a view illustrating that the first bed performs an adsorbing process and the second bed performs a second pressure equalizing process in the system for pressure swing adsorption according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
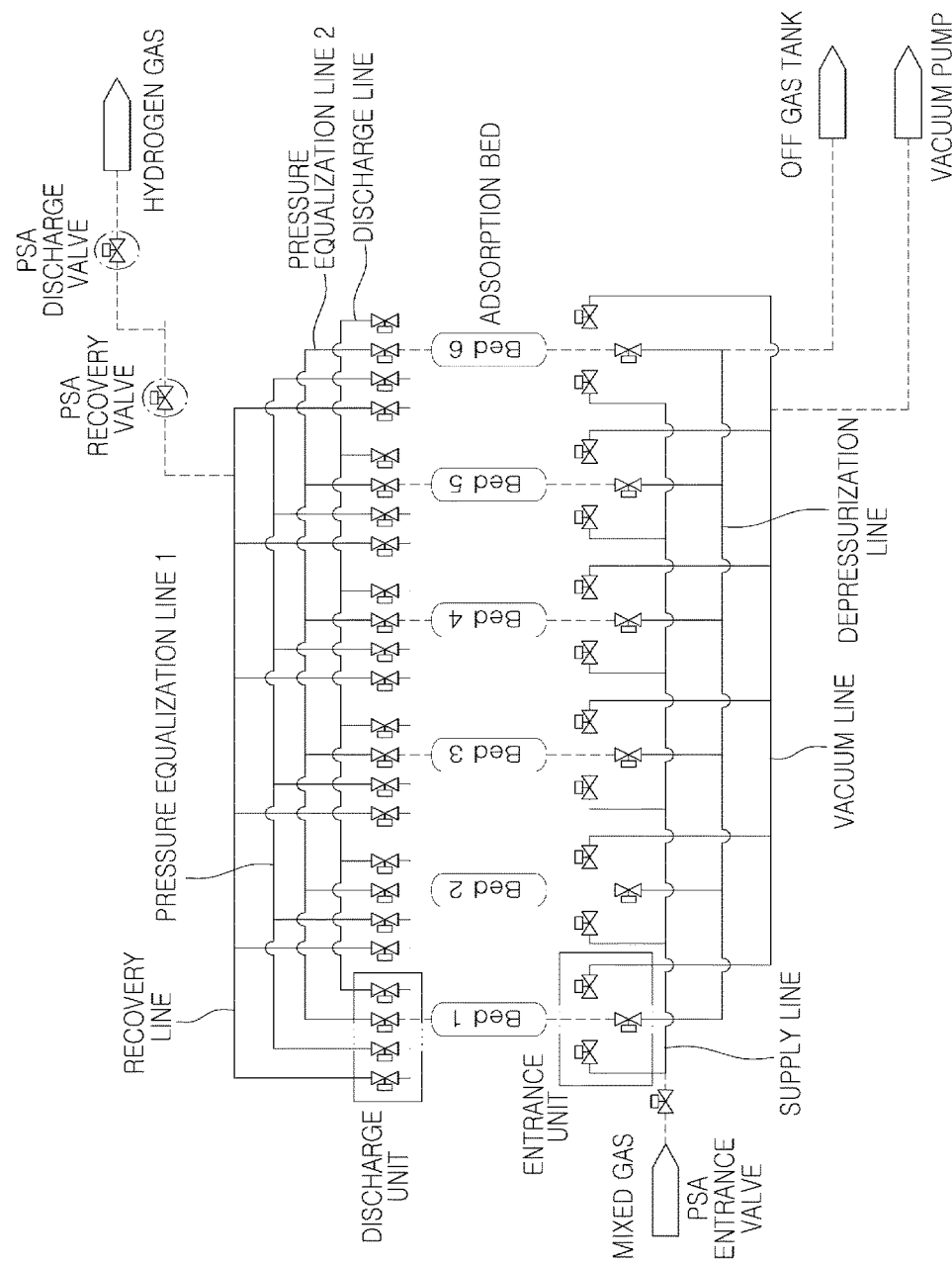
FIG. 1 is a view illustrating a system for pressure swing adsorption according to one form of the present disclosure.
Figure 2:
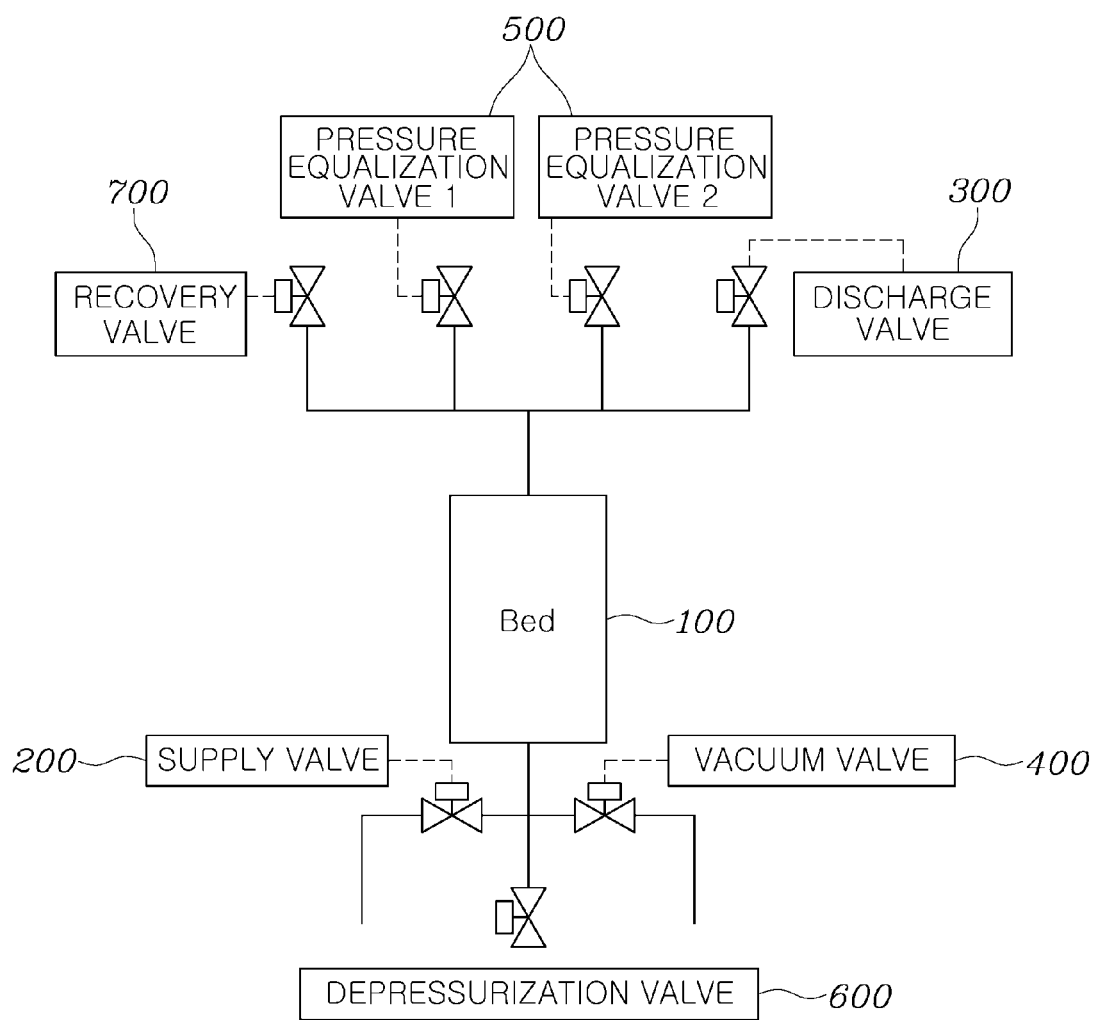
FIG. 2 is a view illustrating a bed in the system for pressure swing adsorption according to another form of the present disclosure.

FIG. 1 is a view illustrating a system for pressure swing adsorption according to one form of the present disclosure. FIG. 2 is a view illustrating a bed in the system for pressure swing adsorption according to another form of the present disclosure. FIG. 3 is a view illustrating processes performed by each bed in the system for pressure swing adsorption according to one form of the present disclosure. FIG. 4 is a view illustrating that a first bed performs an adsorbing process and a second bed performs a first pressure equalizing process in the system for pressure swing adsorption according to one form of the present disclosure. FIG. 5 is a view illustrating that the first bed performs an adsorbing process and the second bed performs a second pressure equalizing process in the system for pressure swing adsorption according to other form of the present disclosure.

As illustrated in FIGS. 1 and 2, the system for pressure swing adsorption includes: a plurality of beds 100 (e.g., adsorption beds in FIG. 1) each performing an adsorbing process, a pressure equalizing process, a vacuum process, or a pressurizing process; a supply valve 200 provided in each of the beds 100 and connected to a mixed gas supply unit to supply a mixed gas to the bed 100; a discharge valve 300 provided in each of the beds 100 and connected to a hydrogen gas discharge unit to discharge hydrogen generated in the bed 100; a vacuum valve 400 provided in each of the beds 100 and connected to a vacuum pump so as to open to the vacuum pump during the vacuum process of the bed 100; and a control unit controlling the supply valve 200, the discharge valve 300, or the vacuum valve 400 provided in each of the beds 100 to allow each of the beds 100 to perform the adsorbing process, the pressure equalizing process, the vacuum process, or the pressurizing process. In addition, the plurality of beds may further perform a depressurizing process or a pressure raising process.

Specifically, the adsorbing process is a process for separating hydrogen from the mixed gas to discharge the hydrogen. During the adsorbing process, the bed is under high pressure. The pressure equalizing process is a process for equalizing a pressure in the bed by connecting the high-pressure bed in which the adsorption has been finished to another low-pressure bed that is on standby. During the pressure equalizing process, the pressure in the bed is lowered. The depressurizing process is a process for discharging the mixed gas to an off-gas tank to remove the mixed gas existing in the bed even after the pressure equalization. During the depressurizing process, the pressure in the bed is further lowered. The vacuum process is a process for removing the mixed gas existing in the adsorption bed even after the depressurization through the vacuum pump. During the vacuum process, the pressure in the bed is greatly lowered. The pressurizing process is a process for raising the pressure in the bed by connecting the bed in which the cleaning has been finished to another bed in which adsorption has been finished. During the pressurizing process, the pressure in the bed is raised. The pressure raising process is a process for raising the pressure in the bed after the pressurization to be the same as that in the adsorbing process to prepare adsorption, and the pressure in the bed is raised by supplying the hydrogen extracted through the system for pressure swing adsorption thereto.

In addition, in the system for pressure swing adsorption according to one form of the present disclosure, for an adsorption bed performing the adsorbing process, the control unit may open the supply valve 200 and the discharge valve 300 of the adsorption bed to supply the mixed gas to the adsorption bed through the supply valve 200 and discharge the generated hydrogen through the discharge valve 300.

Meanwhile, in the system for pressure swing adsorption according to one form of the present disclosure, for a vacuum bed performing the vacuum process, the control unit may open the vacuum valve 400 of the vacuum bed to remove the mixed gas in the vacuum bed through the vacuum pump. Conventionally, the mixed gas existing in the bed after the depressurizing process is removed through a cleaning process instead of the vacuum process, but the hydrogen extracted through the system for pressure swing adsorption is used in the cleaning process. Since the extracted hydrogen is used in the cleaning process as well as in the pressure raising process, the hydrogen extracting efficiency of the system for pressure swing adsorption is inferior. Thus, the control unit controls the vacuum valve 400 connected to the pump in the bed 100 to allow the bed 100 to perform the vacuum process such that the mixed gas in the bed is removed using the vacuum pump, rather than hydrogen, thereby increasing a hydrogen recovery rate of the system for pressure swing adsorption, whereas the cleaning process uses hydrogen.

In addition, in the system for pressure swing adsorption according to one form of the present disclosure, one or more pressure equalization valves 500 may be provided in each of the beds, and the respective beds may be connected to each other through the pressure equalization valves 500. In the system for pressure swing adsorption in one form of the present disclosure, for a pressure equalization bed performing the pressure equalizing process and a pressurization bed performing the pressurizing process, the control unit may open the pressure equalization valves 500 of the pressure equalization bed and the pressurization bed to equalize a pressure between the pressure equalization bed and the pressurization bed through the pressure equalization valves 500. The pressure equalization valves in the respective beds are connected to each other, thereby forming pressure equalization lines connecting the beds to each other as many as the number of pressure equalization valves. The control unit may open or close the pressure equalization valves 500 provided in each of the beds. When the pressure equalization valves 500 in a pair of beds are opened, the gas may be exchanged between the pair of beds to equalize a pressure between the pair of beds.

Meanwhile, in the system for pressure swing adsorption according to another form of the present disclosure, the control unit may control the supply valve 200, the discharge valve 300, the vacuum valve 400, or the pressure equalization valves 500 provided in each of the beds 100 to allow each of the beds 100 to sequentially perform the adsorbing process, the pressure equalizing process, the vacuum process, and the pressurizing process. The control unit opens the supply valve 200 and the discharge valve 300 during the adsorbing process, opens the vacuum valve 400 during the vacuum process, and opens the pressure equalization valves 500 during the pressure equalizing process and during the pressurizing process. Accordingly, the control unit controls each of the beds 100 to perform the respective processes sequentially and repeatedly to extract hydrogen.

In addition, in the system for pressure swing adsorption according to another form of the present disclosure, a depressurization valve 600 may be provided in each of the beds, the depressurization valve 600 may be connected to the off-gas tank, and for the pressure equalization bed that has performed the pressure equalizing process, the control unit may open the depressurization valve 600 of the pressure equalization bed to discharge the mixed gas to the off-gas tank. The pressure in the pressure equalization bed after the depressurizing process, in which the mixed gas is discharged to the off-gas tank by opening the depressurization valve 600, is further lowered than that in the pressure equalizing process.

Meanwhile, in the system for pressure swing adsorption according to one form of the present disclosure, a recovery valve 700 may be provided in each of the beds, the recovery valve 700 may be connected to the hydrogen gas discharge unit, and for a pressurization bed that has performed the pressurizing process, the control unit may open the recovery valve 700 of the pressurization bed to supply the hydrogen from the hydrogen gas discharge unit to the pressurization bed. The pressure in the pressurization bed after the pressure raising process, in which the hydrogen is supplied from the hydrogen gas discharge unit to the pressurization bed by opening the recovery valve 700, is further raised than that in the pressurizing process. At this time, the hydrogen is supplied from the hydrogen gas discharge unit to a separate recovery line for the pressure raising process through a pressure swing adsorption (PSA) recovery valve connected to the recovery line. Since the recovery line is connected to the recovery valve 700 provided in each of the beds 100, when the recovery valve 700 is opened, the hydrogen may be supplied to the bed 100 to raise the pressure in the bed 100.

FIG. 3 is a view illustrating processes performed by each of the beds in the system for pressure swing adsorption according to an exemplary form of the present disclosure. FIG. 4 is a view illustrating that a first bed performs an adsorbing process and a second bed performs a first pressure equalizing process in the system for pressure swing adsorption according to another form of the present disclosure. FIG. 5 is a view illustrating that the first bed performs an adsorbing process and the second bed performs a second pressure equalizing process in the system for pressure swing adsorption in form of the present disclosure. In the system for pressure swing adsorption in another form of the present disclosure, the control unit may generate a process sequence such that processes performed by the respective beds 100 do not overlap, and each of the beds 100 may repeatedly perform the adsorbing process, the pressure equalizing process, the vacuum process, or the pressurizing process according to the process sequence. The process sequence is a sequence in which each of the beds 100 sequentially and repeatedly performs the adsorbing process, the pressure equalizing process, the depressurizing process, the vacuum process, the pressurizing process, and the pressure raising process, and each of the beds 100 performs the pressure equalizing process or the pressurizing process while being connected to another one of the beds 100 during the process. Thus, as illustrated in FIG. 3, the control unit generates a process sequence such that the respective beds 100 perform different processes in the same time zone.

On the other hand, in the system for pressure swing adsorption according to one form of the present disclosure, the control unit may generate a process sequence such that one or more of the plurality of beds 100 perform the vacuum process, and one or more of the vacuum valves 400 may be opened according to the process sequence. The control unit may generate a process sequence such that any one of the plurality of beds 100 performs the vacuum process at all times. Accordingly, the vacuum pump connected to the bed 100 may be continuously operated at all times, without being stopped, when the system for pressure swing adsorption is operated, thereby minimizing a load applied to the vacuum pump and reducing a possibility of failure of the vacuum pump, resulting in cost saving in maintaining and managing the vacuum pump.

In addition, in the system for pressure swing adsorption according to another form of the present disclosure, the number of beds 100 may be six, and the control unit may generate a process sequence such that a first bed performs the adsorbing process, a second bed and a third bed perform a process including the pressure equalizing process, a fourth bed performs the vacuum process, and a fifth bed and a sixth bed perform a process including the pressurizing process. In the system for pressure swing adsorption according to one form of the present disclosure, the control unit controls the six beds 100 to perform respective processes that are not identical to each other in every cycle. In the system for pressure swing adsorption according to another form of the present disclosure, each of the beds 100 may perform a plurality of processes, and the control unit may generate a process sequence such that each of the beds 100 sequentially performs the adsorbing process, a first pressure equalizing process, a second pressure equalizing process, a third pressure equalizing process, the vacuum process, a first pressurizing process, a second pressurizing process, and a third pressurizing process. In the system for pressure swing adsorption according to one form of the present disclosure, the control unit may control each of the beds 100 to perform the depressurizing process when the third pressure equalizing process is finished and perform the pressure raising process when the third pressurizing process is finished.

For example, the system for pressure swing adsorption according to one form of the present disclosure includes six beds 100, and each of the beds performs respective processes for 12 steps, that is, 12 cycles. Referring to FIG. 3, the adsorbing process is performed in two cycles, the pressure equalizing process is performed in three cycles, the depressurizing process is performed in one cycle, the vacuum process is performed in two cycles, the pressurizing process is performed in three cycles, and the pressure raising process is performed in one cycle. Since the adsorbing process and the vacuum process are performed in two cycles, hydrogen extracting efficiency is increased and a hydrogen extraction-finished mixed gas removal rate is increased. In addition, since the pressure equalizing process and the depressurizing process are performed in three cycles, a sufficient time is given to equalize a pressure between the beds, resulting in an increase in efficiency as compared to those in conventional processes. Since the respective beds 100 consecutively perform different processes in every cycle, the system for pressure swing adsorption may continuously extract hydrogen.

Meanwhile, FIGS. 4 and 5 are views illustrating the six beds 100 and the respective processes performed by the six beds 100 in steps 1 and 2 of FIG. 3, respectively. In steps 1 and 2, the first bed performs the adsorbing process, the second bed performs the first pressure equalizing process and the second pressure equalizing process respectively, the third bed performs the third pressure equalizing process and the depressurizing process respectively, the fourth bed performs the vacuum process, the fifth bed performs the first pressurizing process and the second pressurizing process respectively, and the sixth bed performs the third pressurizing process and the pressure raising process respectively. In steps 1 and 2, since the first bed performs the adsorbing process, the supply valve 200 and the discharge valve 300 thereof are opened. In step 1, since the second bed performs the first pressure equalizing process and the sixth bed performs the third pressurizing process, the pressure equalization valves 500 thereof are opened and the second bed and the sixth bed are connected to each other through pressure equalization line 2. In step 2, since the second bed performs the second pressure equalizing process and the fifth bed performs the second pressurizing process, the pressure equalization valves 500 thereof are opened and the second bed and the fifth bed are connected to each other through pressure equalization line 2. In addition, in step 1, since the third bed performs the third pressure equalizing process and the fifth bed performs the first pressurizing process, the pressure equalization valves 500 thereof are opened and the third bed and the fifth bed are connected to each other through pressure equalization line 1. In step 2, since the third bed performs the depressurizing process, the depressurization valve 600 thereof is opened, and since the sixth bed performs the pressure raising process, the recovery valve 700 thereof is opened. In steps 1 and 2, since the fourth bed performs the vacuum process, the vacuum valve 400 thereof is opened.

In addition, a method for pressure swing adsorption according to another form of the present disclosure includes: a supply step of supplying a mixed gas to each of a plurality of beds from a mixed gas supply unit; a process step of performing an adsorbing process, a pressure equalizing process, a vacuum process, or a pressurizing process in each of the plurality of beds; and a discharge step of discharging hydrogen generated in each of the plurality of beds to a hydrogen gas discharge unit. In the method for pressure swing adsorption according to one form of the present disclosure, in the performing of the process, when the vacuum process is performed in the bed, the bed may be connected to a vacuum pump to remove the mixed gas from the bed.

In the system and the method for pressure swing adsorption according to one form of the present disclosure, the conventional cleaning process is eliminated and the vacuum process is performed using the vacuum pump to replace the conventional cleaning process, thereby preventing the extracted hydrogen from being wasted and accordingly increasing hydrogen extracting efficiency and processing efficiency, and each of the beds sequentially performs processes while the processes performed by the respective beds in every cycle are different from each other, thereby increasing processing efficiency and making it possible to continuously operate the vacuum pump for a minimized load thereon, resulting in cost saving in maintaining and managing the vacuum pump.

In the system and the method for pressure swing adsorption according to the present disclosure, hydrogen can be extracted with high efficiency by supplying the mixed gas to the plurality of beds and repeatedly performing the adsorbing process, the pressure equalizing process, the vacuum process, and the pressurizing process in the plurality of beds, the vacuum process being performed using the vacuum pump instead of a conventional cleaning process.

Although the present disclosure has been shown and described with respect to the exemplary forms, it will be apparent to those having ordinary skill in the art that the present disclosure may be variously modified and altered without departing from the spirit and scope of the present disclosure.

What is claimed is:

1. A system for pressure swing adsorption, the system comprising:
a plurality of beds each configured to perform at least one of an adsorbing process, a pressure equalizing process, a vacuum process, or a pressurizing process;
a supply valve provided in each bed of the plurality of beds and connected to a mixed gas supply unit configured to supply a mixed gas to each bed of the plurality of beds;
a discharge valve provided in each bed of the plurality of beds and connected to a hydrogen gas discharge unit configured to discharge hydrogen generated in each bed of the plurality of beds;
a vacuum valve provided in each bed of the plurality of beds and connected to a vacuum pump so as to be open to the vacuum pump during the vacuum process of a bed among the plurality of beds;
a control unit configured to control the supply valve, the discharge valve, and the vacuum valve provided in each bed of the plurality of beds to allow each bed to perform the adsorbing process, the pressure equalizing process, the vacuum process, or the pressurizing process;
a depressurization valve provided in each bed of the plurality of beds; and
a recovery valve provided in each bed of the plurality of beds,
wherein:
each depressurization valve is connected to an off-gas tank,
the plurality of beds includes a pressure equalization bed configured to perform the pressure equalizing process, and
the control unit is configured to open the depressurization valve of the pressure equalization bed, in which the pressure equalization process has been performed, to discharge the mixed gas to the off-gas tank, and
wherein:
each recovery valve is connected to each bed of the plurality of beds by a recovery line to which a pressure swing adsorption (PSA) recovery valve is connected,
the plurality of beds includes a pressurization bed configured to perform the pressurizing process,
the control unit is configured to open the recovery valve of the pressurization bed to supply the hydrogen from the hydrogen gas discharge unit to the pressurization bed, and
a plurality of pressure equalization valves is provided to be connected to each bed of the plurality of beds to form a plurality of pressure equalization lines that correspond to a number of pressure equalization valves of the plurality of pressure equalization valves.

2. The system of claim 1, wherein the plurality of beds includes an adsorption bed performing the adsorbing process, the control unit is configured to:
open the supply valve and the discharge valve of the adsorption bed to supply the mixed gas to the adsorption bed through the supply valve, and
discharge the generated hydrogen through the discharge valve.

3. The system of claim 1, wherein:
the plurality of beds includes a vacuum bed performing the vacuum process, and
the control unit is configured to open the vacuum valve of the vacuum bed to remove the mixed gas in the vacuum bed through the vacuum pump.

4. The system of claim 1, wherein:
the control unit is configured to open the pressure equalization valves of the pressure equalization bed and the pressurization bed to equalize a pressure between the pressure equalization bed and the pressurization bed through the pressure equalization valves.

5. The system of claim 1, wherein the control unit is configured to control the supply valve, the discharge valve, the vacuum valve, or the pressure equalization valves provided in each bed of the plurality of beds to allow each bed to sequentially perform the adsorbing process, the pressure equalizing process, the vacuum process, and the pressurizing process.

6. The system of claim 1, wherein:
the control unit is configured to generate a process sequence such that processes performed by respective beds of the plurality of beds do not overlap, and
each bed of the respective beds repeatedly performs the adsorbing process, the pressure equalizing process, the vacuum process, or the pressurizing process according to the process sequence.

7. The system of claim 1, wherein the control unit is configured to generate a process sequence such that at least one bed of the plurality of beds performs the vacuum process, and at least one vacuum valve of the vacuum valves is opened according to the process sequence.

8. The system of claim 1, wherein:
the plurality of beds includes a first bed, a second bed, a third bed, a fourth bed, a fifth bed and a sixth bed, and
the control unit is configured to generate a process sequence such that the first bed performs the adsorbing process, the second bed and the third bed perform a process including the pressure equalizing process, the fourth bed performs the vacuum process, and the fifth bed and the sixth bed perform a process including the pressurizing process.

9. The system of claim 8, wherein the control unit is configured to control the first, second, third, fourth, fifth and sixth beds to perform respective processes that are not identical to each other in every cycle.

10. The system of claim 1, wherein:
the control unit is configured to generate a process sequence such that each bed of the plurality of beds sequentially performs the adsorbing process, a first pressure equalizing process, a second pressure equalizing process, a third pressure equalizing process, the vacuum process, a first pressurizing process, a second pressurizing process, and a third pressurizing process.

11. The system of claim 10, wherein the control unit is configured to control the plurality of beds to perform a depressurizing process when the third pressure equalizing process is finished and perform a pressure raising process when the third pressurizing process is finished.

12. A method for pressure swing adsorption, the method comprising:
a supply step of supplying a mixed gas to each bed of a plurality of beds from a mixed gas supply unit;
a process step of performing an adsorbing process, a pressure equalizing process, a vacuum process, or a pressurizing process in each bed of the plurality of beds;

a discharge step of discharging hydrogen generated in each bed of the plurality of beds to a hydrogen gas discharge unit, wherein each bed of the plurality of beds is provided with a depressurization valve connected to an off-gas tank and a recovery valve;

forming a plurality of pressure equalization lines connecting pressure equalization valves to each bed of the plurality of beds such that the plurality of pressure equalization lines corresponds to a number of the pressure equalization valves;

performing the pressure equalizing process in a pressure equalization bed of the plurality of beds;

opening the depressurization valve of the pressure equalization bed, in which the pressure equalization process has been performed, to discharge the mixed gas to the off-gas tank;

providing the recovery valve in a recovery line to which a pressure swing adsorption (PSA) recovery valve is connected; and opening the recovery valve to supply the hydrogen from the hydrogen gas discharge unit to a pressurization bed of the plurality of beds, in which the pressurizing process has been performed.

13. The method of claim 12, wherein in performing the vacuum process, a bed of the plurality of beds is connected to a vacuum pump to remove the mixed gas from the connected bed.

* * * * *